US010338690B2

(12) United States Patent
Murase

(10) Patent No.: US 10,338,690 B2
(45) Date of Patent: Jul. 2, 2019

(54) INFORMATION PROCESSING APPARATUS, INTERACTION METHOD, AND RECORDING MEDIUM

(71) Applicant: FUJITSU LIMITED, Kawasaki-shi, Kanagawa (JP)

(72) Inventor: Taichi Murase, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 195 days.

(21) Appl. No.: 15/636,726

(22) Filed: Jun. 29, 2017

(65) Prior Publication Data
US 2018/0004300 A1 Jan. 4, 2018

(30) Foreign Application Priority Data

Jul. 4, 2016 (JP) ................. 2016-132740

(51) Int. Cl.
G06F 3/01 (2006.01)
G06K 9/00 (2006.01)
(Continued)

(52) U.S. Cl.
CPC ............ *G06F 3/017* (2013.01); *G06F 3/0425* (2013.01); *G06K 9/00355* (2013.01); *G06K 9/6215* (2013.01)

(58) Field of Classification Search
CPC ..... G06F 3/017; G06F 3/0425; G06K 9/6215; G06K 9/00355
See application file for complete search history.

(56) References Cited

U.S. PATENT DOCUMENTS

2012/0176477 A1* 7/2012 Givon .................. G06T 17/00
348/46
2012/0268364 A1* 10/2012 Minnen ................ G06F 3/017
345/156
(Continued)

FOREIGN PATENT DOCUMENTS

JP 2001-282456 10/2001
JP 2015-022624 2/2015

OTHER PUBLICATIONS

Crowley, James, Francois Berard, and Joelle Coutaz. "Finger tracking as an input device for augmented reality." In International Workshop on Gesture and Face Recognition, pp. 195-200. 1995. (Year: 1995).*
(Continued)

Primary Examiner — Carol Wang
(74) Attorney, Agent, or Firm — Fujitsu Patent Center

(57) ABSTRACT

An information processing apparatus includes: a memory that stores a target region image generated in the past that indicates a distance to a target object; and a processor coupled to the memory and configured to calculate a hand region within a range image obtained after the target region image has been generated, the range image indicating a distance to a hand and the target object, detect a movement of the target object, when a movement of the target object is not detected, generate a complemented image by complementing, using the target region image, the portion that corresponds to the hand region within the image from which the hand region has been deleted, update the target region image with the complemented image, and, when a movement of the target object has been detected, update the target region image with the image from which the hand region has been deleted.

12 Claims, 10 Drawing Sheets

(51) Int. Cl.
*G06K 9/62* (2006.01)
*G06F 3/042* (2006.01)

(56) References Cited

U.S. PATENT DOCUMENTS

| | | | |
|---|---|---|---|
| 2012/0306876 A1* | 12/2012 | Shotton | G06T 17/10 345/424 |
| 2015/0161773 A1* | 6/2015 | Takahashi | H04N 5/2171 382/173 |

OTHER PUBLICATIONS

Wataru Watanabe et al., "Development and Improved Operability of Projection Plane Touch UI Based on Projector and Depth Camera", 21st Image Sensing Symposium, Jun. 2015 (4 pages), English translation.

\* cited by examiner

INFORMATION PROCESSING APPARATUS, INTERACTION METHOD, AND RECORDING MEDIUM

CROSS-REFERENCE TO RELATED APPLICATION

This application is based upon and claims the benefit of priority of the prior Japanese Patent Application No. 2016-132740, filed on Jul. 4, 2016, the entire contents of which are incorporated herein by reference.

FIELD

The embodiments discussed herein are related to an information processing apparatus, an interaction method, and a recording medium.

BACKGROUND

Recently, techniques such as Augmented Reality (AR) and the Internet of Things (IoT) have been actively developed for linking the actual world and virtual information so as to achieve interactions. Interface apparatuses have been developed that identify the positions of a real object and a finger using a range sensor so as to enable an interaction between the real object and the finger. The interaction between the real object and the finger means actions such as touching the object or tracing fingers over the object.

A technique is also known for decreasing erroneous detections of operations or designated positions based on a user's hand operations in an environment where objects included in an input image are moved by the user's operations (see, for example, patent document 1).

For an interaction between an actual object (target object) and a finger, the target object is installed to perform a calibration process in advance. The calibration process is a process of placing a target object and of registering the position of the object, e.g., the distance between a range sensor and the target object, with the hand removed from the shooting range of the range sensor. The calibration process is also performed when the target object has moved.

Performing the calibration process every time a target object is installed or moved is very burdensome and leads to a problem of usability loss.

Patent Document 1: Japanese Laid-open Patent Publication No. 2015-22624

Patent Document 2: Japanese Laid-open Patent Publication No. 2001-282456

Non-Patent document 1: Wataru WATANABE and three others, "Development and Improved Operability of Projection Plane Touch UI Based on Projector and Depth Camera", 21st Image Sensing Symposium, June 2015

SUMMARY

According to an aspect of the invention, an information processing apparatus includes a memory and a processor.

The memory stores a target region image generated in the past that indicates a distance to a target object.

The processor is coupled to the memory. The processor calculates a hand region within a range image obtained after the target region image has been generated, the range image indicating a distance to a hand and the target object.

The processor detects a movement of the target object by comparing the target region image with an image that is the range image with the hand region deleted therefrom.

When a movement of the target object is not detected, the processor generates a complemented image by complementing, using the target region image, the portion that corresponds to the hand region within the image from which the hand region has been deleted.

When a movement of the target object is not detected, the processor updates the target region image with the complemented image. When a movement of the target object has been detected, the processor updates the target region image with the image from which the hand region has been deleted.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
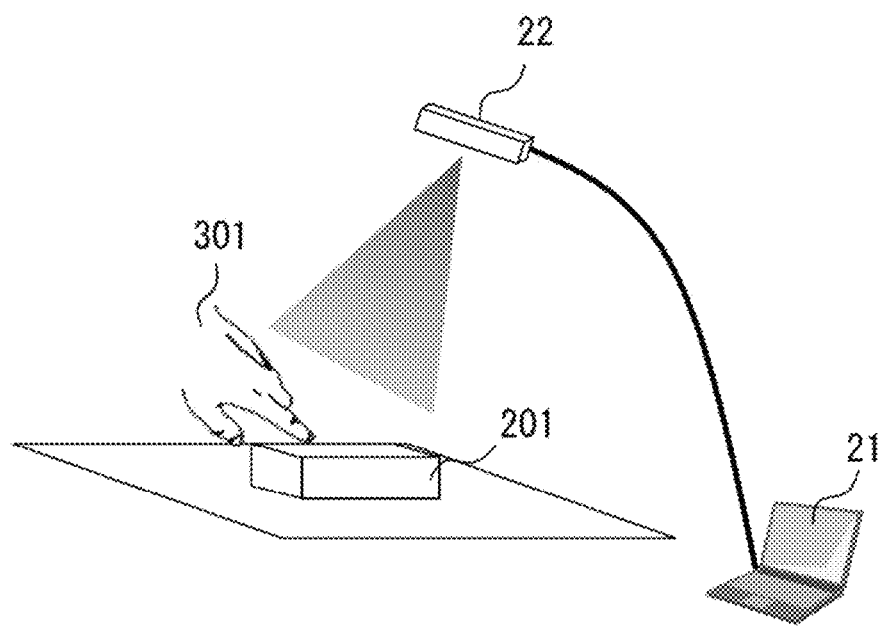
FIG. 1 illustrates an example of a use of an information processing apparatus that includes a range sensor in accordance with an embodiment.

The following describes embodiments by referring to the drawings.

FIG. 1 illustrates an example of a use of an information processing apparatus that includes a range sensor in accordance with an embodiment.

In FIG. 1, a target object 201 is on a table; a range sensor 22 is installed above the target object 201 and a hand 301, measures the distance between the range sensor 22 and the target object 201, and the distance between the range sensor 22 and the hand 301, and outputs the measurement result to an information processing apparatus 21.

According to the measurement result, the information processing apparatus 21 detects an action of a fingertip of the user's hand 301 taken on the target object 201, such as touching the target object 201 or tracing over the target object 201, and performs processing that corresponds to the detected action. The information processing apparatus 21 is, for example, a personal computer (PC).

Figure 2:
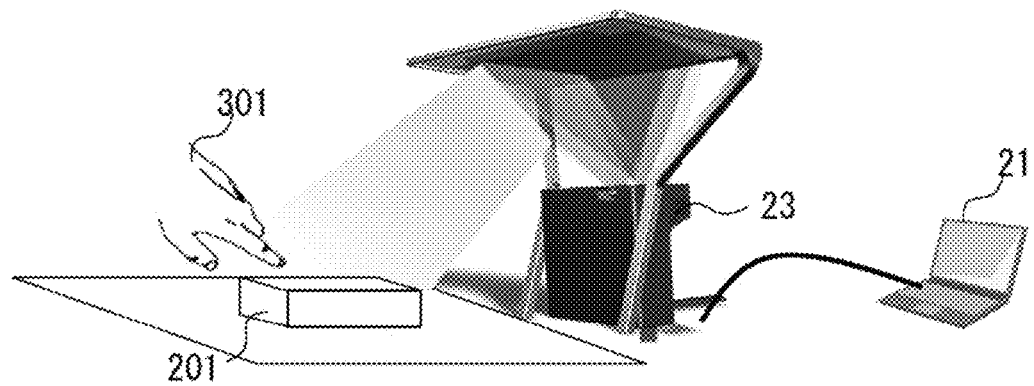
FIG. 2 illustrates an example of a use of an information processing apparatus that includes an interactive projector in accordance with an embodiment.

FIG. 2 illustrates an example of a use of an information processing apparatus that includes an interactive projector in accordance with an embodiment.

In FIG. 2, the target object 201 is on a table, and an interactive projector 23 is installed near the target object 201 and the hand 301.

The interactive projector 23 includes a mirror and irradiates the mirror with projection light for forming a predetermined image. The illumination light is reflected from the mirror and irradiates the target object 201, thereby forming a predetermined image on the target object.

The interactive projector 23 includes a range sensor, measures the distance between the range sensor and the target object 201 or the hand 301, and outputs the measurement result to the information processing apparatus 21.

According to the measurement result, the information processing apparatus 21 detects an action of a fingertip of the user's hand 301 taken on the target object 201, such as touching the target object 201 or tracing over the target object 201, and performs processing that corresponds to the detected action.

Figure 3:
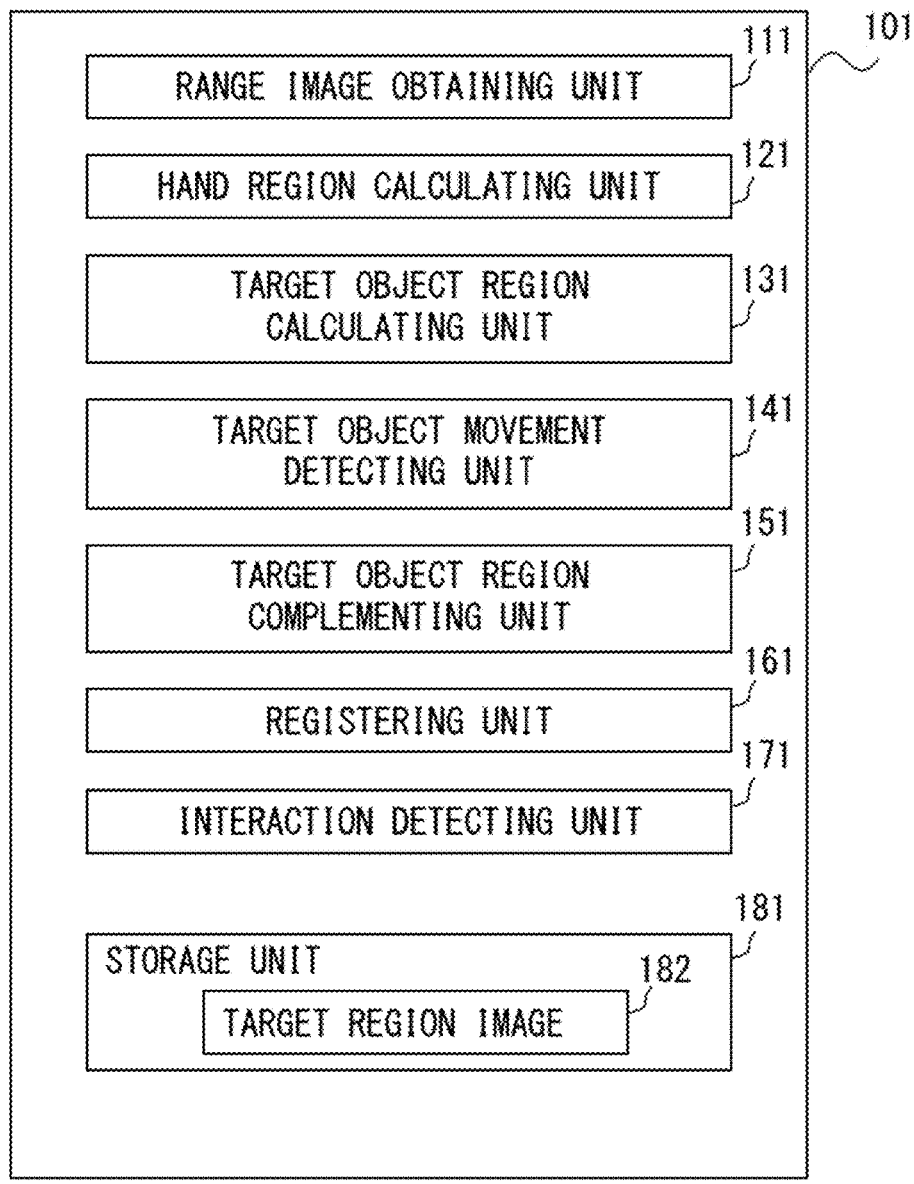
FIG. 3 is the configuration diagram of an information processing apparatus in accordance with an embodiment.

FIG. 3 is the configuration diagram of an information processing apparatus in accordance with an embodiment.

An information processing apparatus 101 includes a range image obtaining unit 111, a hand region calculating unit 121, a target object region calculating unit 131, a target object movement detecting unit 141, a target object region complementing unit 151, a registering unit 161, an interaction detecting unit 171, and a storage unit 181.

The information processing apparatus 101 is a computer, e.g., a PC. The information processing apparatus 101 corresponds to the information processing apparatus 21 depicted in FIGS. 1 and 2.

The range image obtaining unit 111 measures the distance between the range image obtaining unit 111 and an object within a shooting range, converts the measured distance into a value that falls within a predetermined range (e.g., 0-255), and generates a range image (depth map) that has the value as a pixel value. The range image is a grayscale image representing the measured distance using shades of gray with, for example, the pixel value of pixels falling within a range of 0 to 255. The range image becomes darker (more intensely colored) as the distance becomes shorter, leading to a lower pixel value; the range image becomes brighter (more softly colored) as the distance becomes longer, leading to a higher pixel value. The range image obtaining unit 111 is, for example, a range sensor. The range image obtaining unit 111 corresponds to the range sensor 22 depicted in FIG. 1 and the range sensor included in the interactive projector 23.

The hand region calculating unit 121 calculates the region of the hand (hand region) from a range image. The hand region calculating unit 121 calculates a hand region according to, for example, a distance indicated by the pixel values of the range image. When, for example, the range sensor is installed above the target object 201, as depicted in FIG. 1, the hand is considered to be closer to the range sensor than the target object is. Accordingly, the hand region calculating unit 121 calculates, as a hand region, a region of the range image that has pixel values that are equal to or less than a threshold. The hand region calculating unit 121 also calculates the positions (coordinates) of fingertips in the hand image within the range image. The hand region calculating unit 121 may calculate the positions of all fingertips within the hand region, or may calculate only the position of the tip of a predetermined finger (e.g., index finger).

The target object region calculating unit 131 deletes the hand region from the range image. A range image from which a hand region has been deleted will hereinafter be referred to as a hand-region-deleted image.

The target object movement detecting unit 141 detects a movement of a target object. In particular, the target object movement detecting unit 141 compares a hand-region-deleted image with a target region image 182 created in the past, so as to determine whether the target object has been moved. The target region image 182 created in the past is one that was stored in the storage unit 181 the last time an interaction process was performed.

The target object region complementing unit 151 creates a complemented image by complementing, using a target region image 182 created in the past, the portion that corresponds to a hand region within an image from which the hand region has been deleted.

When a movement of the target object is not detected, the registering unit 161 stores (registers) the complemented image in the storage unit 181 as a new target image 182. In particular, the registering unit 161 updates a target region image 182 created in the past that is currently stored in the storage unit 181 to the complemented image. When a movement of the target object has been detected, the registering unit 161 stores (registers) a hand-region-deleted image in the storage unit 181 as a new target region image 182. In particular, the registering unit 161 updates a target region image 182 created in the past that is currently stored in the storage unit 181 to the hand-region-deleted image. The registering unit 161 is an example of the updating unit.

The interaction detecting unit 171 detects a touch on a target object according to Zref, a reference height, Z, a fingertip height, and α, a margin.

The storage unit 181 is a storage apparatus that stores a program, data, and the like to be used by the information processing apparatus 101. The storage unit 181 stores target region images 182.

Figure 4:
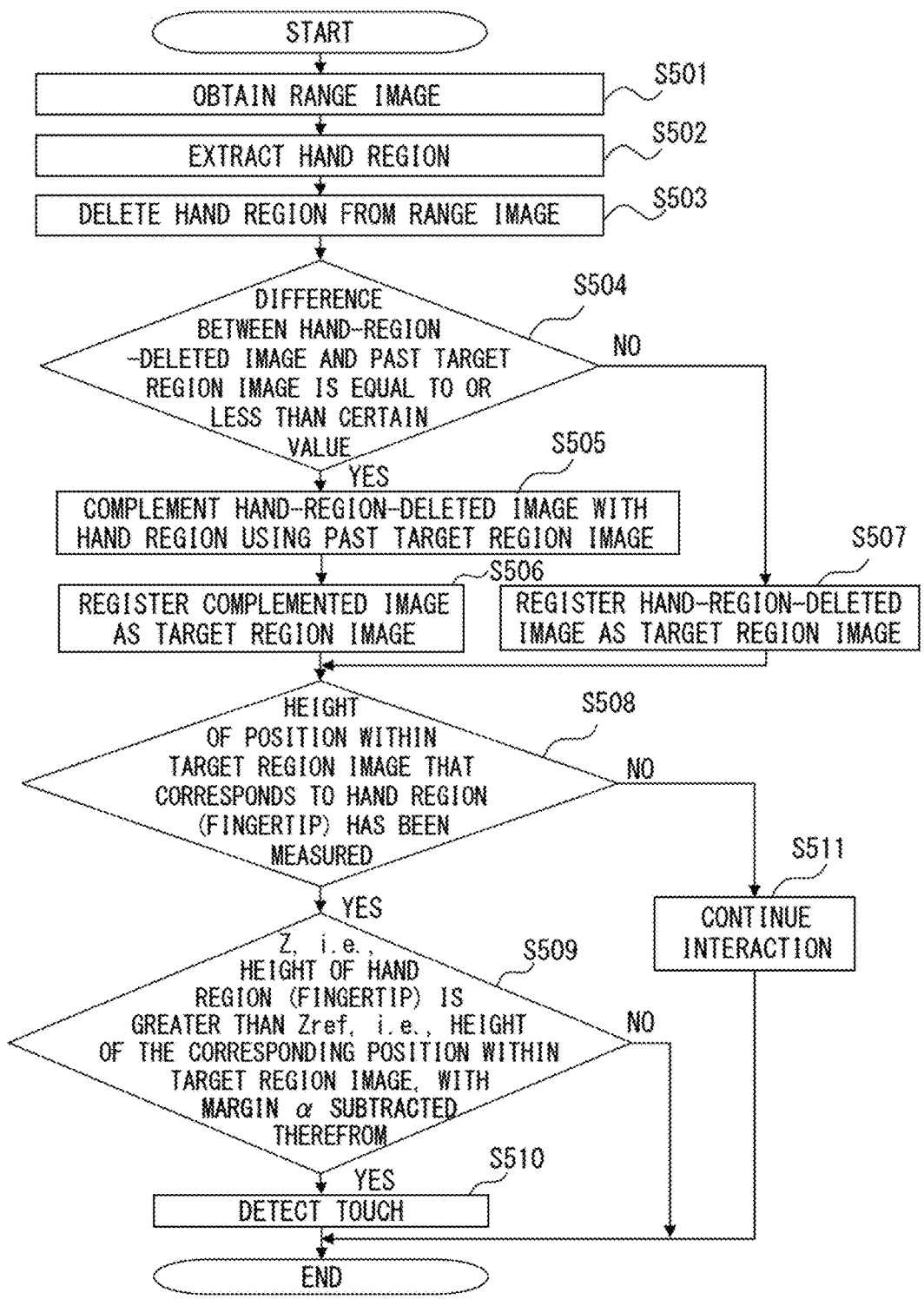
FIG. 4 is a flowchart of an interaction process in accordance with an embodiment.

FIG. 4 is a flowchart of an interaction process in accordance with an embodiment.

Figure 5:
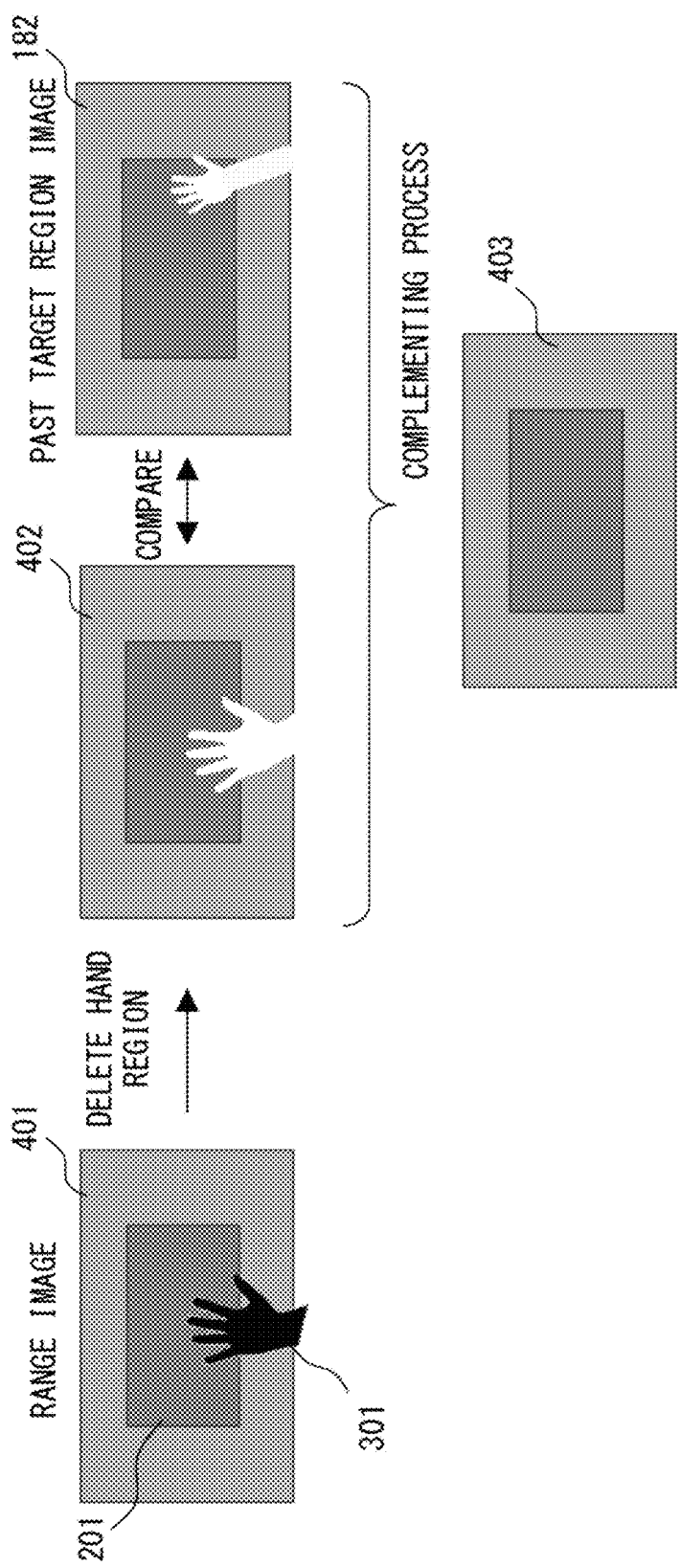
FIG. 5 is an explanatory diagram for an interaction process in accordance with an embodiment.

FIG. 5 is an explanatory diagram for an interaction process in accordance with an embodiment.

In an embodiment, a cuboid object (target object) 201 is on a table, and the range image obtaining unit 111 is installed above the target object 201. The user takes an action on the target object 201, such as touching the target object 201 with a fingertip, and the information processing apparatus 101 detects the action and performs corresponding processing.

In step S501, the range image obtaining unit 111 obtains a range image 401. In FIG. 5, the range image 401 includes the target object 201 and a hand 301.

In step S502, the hand region calculating unit 121 calculates the region of the hand 301 (hand region) from the range image 401. The hand region calculating unit 121 also calculates the position of a fingertip of the hand region. In an embodiment, the position of the tip of the forefinger is detected as the position of a fingertip.

In step S503, the target object region calculating unit 131 generates a hand-region-deleted image 402 by deleting the hand region from the range image 401.

In step S504, the target object movement detecting unit 141 calculates differences between the pixel values of individual pixels of the hand-region-deleted image 402 and the pixel values of corresponding pixels of a past target region image 182 stored in the storage unit 181. The target object movement detecting unit 141 calculates, as an evaluation value, the number of differences that are equal to or greater than a threshold a from among the plurality of calculated differences. The past target region image 182 is one that was stored in the storage unit 181 the last time the interaction process was performed.

The target object movement detecting unit 141 compares the evaluation value with a threshold b, and determines according to the comparison result whether the target object 201 has been moved. In particular, when the evaluation value is equal to or less than the threshold b, the target object movement detecting unit 141 determines that the target object 201 has not been moved, and the control shifts to step S505. When the evaluation value is greater than the threshold b, the target object movement detecting unit 141 determines that the target object 201 has been moved, and the control shifts to step S507.

When the target object 201 has been moved after the last time the interaction process was performed, the evaluation value becomes greater than the threshold b. When the target object 201 has not been moved after the last time the interaction process was performed, the evaluation value becomes equal to or less than the threshold b.

In step S505, the target object region complementing unit 151 creates a complemented image 403 by complementing, using the target region image 182 created in the past, the portion of the hand-region-deleted image 402 that corresponds to the hand region.

In step S506, the complemented image 403 is stored (registered) in the storage unit 181 as a new target region image 182. In particular, the registering unit 161 updates a target region image 182 created in the past that is currently stored in the storage unit 181 to the complemented image 403.

In step S507, the registering unit 161 stores (registers) the hand-region-deleted image 402 in the storage unit 181 as a new target region image 182. In particular, the registering unit 161 updates a target region image 182 created in the past that is currently stored in the storage unit 181 to the hand-region-deleted image 402.

In step S508, the interaction detecting unit 171 determines whether the height of the position within of the target region image 182 that corresponds to the position of the fingertip of the hand region has been measured. When a pixel value has been obtained for the position within the target region image 182 that corresponds to the position of the fingertip of the hand region, the interaction detecting unit 171 determines that the height of the position within the target region image 182 that corresponds to the fingertip position has been measured, and the control shifts to step S509. When a pixel value has not been obtained for the position within the target region image 182 that corresponds to the position of the fingertip of the hand region, the interaction detecting unit 171 determines that the height of the position within the target region image 182 that corresponds to the fingertip position has not been measured, and the control shifts to step S511.

In step S509, the interaction detecting unit 171 determines whether the height Z, i.e., the height (pixel value) of the position within the range image 401 that corresponds to the height of the fingertip position of the hand 301, is greater than the reference height Zref with the margin $\alpha$ subtracted therefrom. The reference height Zref is the height (pixel value) of the position within the target region image 182 that corresponds to the position of the fingertip within the range image 401. When $Z > Zref - \alpha$ (i.e., when the difference between the reference height Zref and the fingertip height Z is less than the margin $\alpha$), the control shifts to step S510. When $Z \leq Zref - \alpha$, the interaction detecting unit 171 determines that a touch has not been detected, and the process ends.

Figure 6:
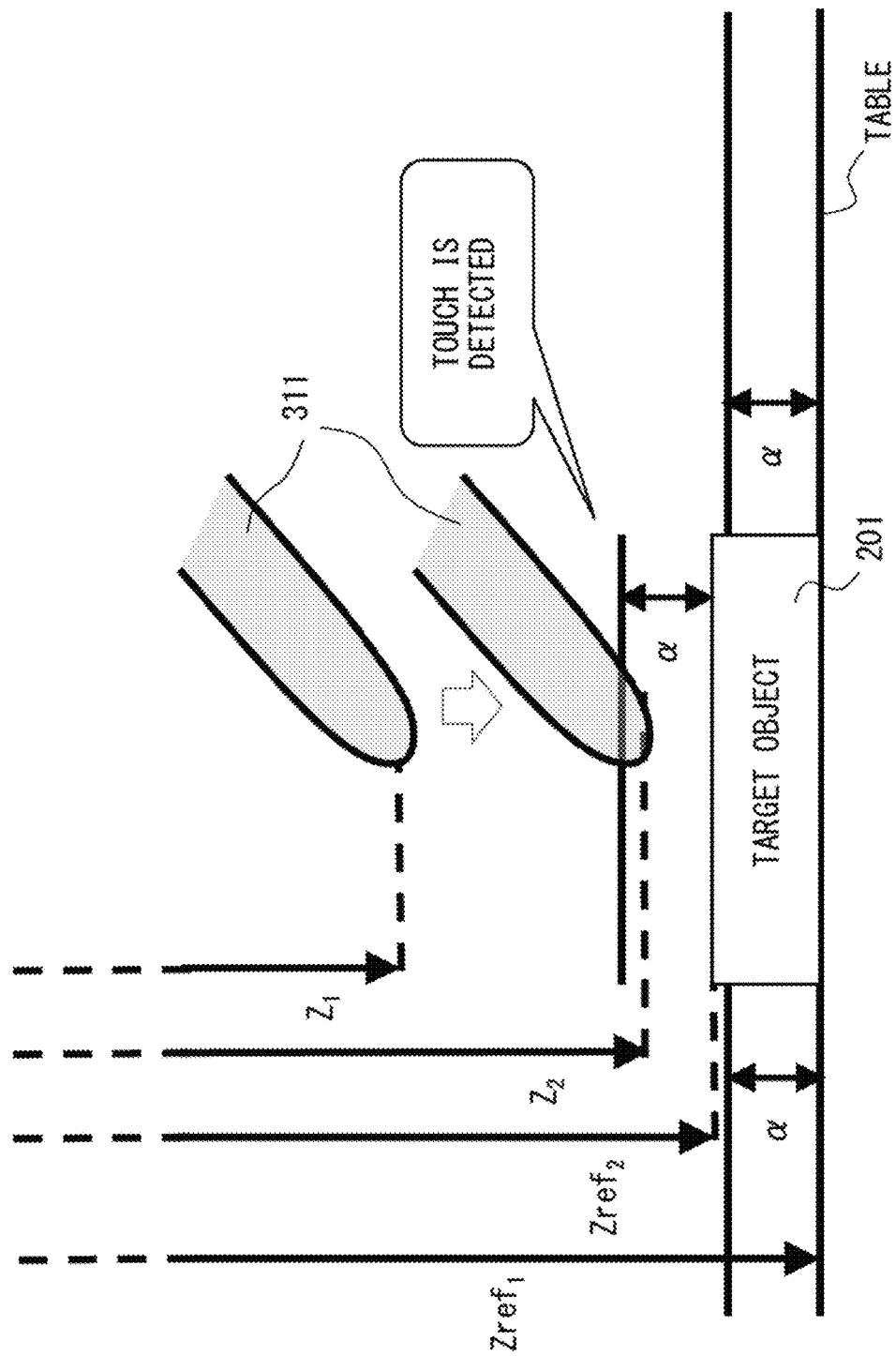
FIG. 6 is an explanatory diagram for touch detection.

FIG. 6 is an explanatory diagram for touch detection.

In FIG. 6, finger heights Z and reference heights Zref indicate the distances from the range image obtaining unit 111 (not illustrated) located above the target object 201, and the finger heights Z and the reference heights Zref correspond to the pixel values of pixels of the range image 401 and the target region image 182.

Referring to FIG. 6, the tip of a finger 311 is located above the target object 201, i.e., located within the region of the target object 201 in the range image 401. In this situation, the reference height Zref is $Zref_2$, which is the height of the target object 201, i.e., the pixel value of a pixel that corresponds to the fingertip position within the region of the target object 201 in the target region image 182. When the fingertip is located outside the region of the target object 201 in the range image 401, the reference height Zref is $Zref_1$, which is the height of the table, i.e., the pixel value of a pixel that corresponds to the fingertip position outside the region of the target object 201 in the target region image 182.

Assume that the distance between the tip of the finger 311 and the top surface of the target object 201 is equal to or greater than the margin $\alpha$ and that the height of the fingertip is $Z_1$. In this situation, $Z_1 \leq Zref_2 - \alpha$ is satisfied, and hence a touch is not detected.

Assume that the distance between the tip of the finger 311 and the top surface of the target object 201 is less than the margin $\alpha$ and that the height of the fingertip is $Z_2$. In this situation, $Z_2 > Zref_2 - \alpha$ is satisfied, and hence the interaction detecting unit 171 detects a touch.

In step S510, the interaction detecting unit 171 detects a touch. When the fingertip position is within the region of the target object 201 in the target region image 182, the interaction detecting unit 171 determines that the fingertip has touched the target object 201. When the fingertip is located outside the region of the target object 201 in the target region image 182, the interaction detecting unit 171 determines that the fingertip has touched the table. The interaction detecting unit 171 performs predetermined processing that corresponds to the detection of a touch on the target object 201 or the table.

In step S511, the interaction detecting unit 171 continues the interaction for the previous frame. In particular, when a touch was detected in the previous interaction process, the interaction detecting unit 171 also determines that a touch has been detected in the current interaction process, and performs predetermined processing that corresponds to the detection of the touch. When a touch was not detected in the previous interaction process, the interaction detecting unit 171 also determines that a touch has not been detected in the current interaction process.

In an embodiment, the interaction process is performed repeatedly at short intervals (e.g., performed every sixtieth to thirtieth of a second). As a result, a target region image 182 that indicates the position of the target object 201 is registered as soon as the target object 201 has been installed or moved. Information on the height of a portion of the target object 201 that has been hidden by the hand is complemented using a past target region image 182, thereby eliminating the need for the conventional calibration process.

When a target object has been installed or moved, the information processing apparatus in accordance with an embodiment immediately enables the interaction.

When a target object has been installed or moved, the information processing apparatus in accordance with an embodiment does not need to perform the conventional calibration process, thereby improving the usability.

Unlike the case in the invention of patent document 2, the information processing apparatus in accordance with an embodiment does not need to assign markers (barcodes) to identify the three-dimensional shape of a target object, thereby improving the usability.

Figure 7:
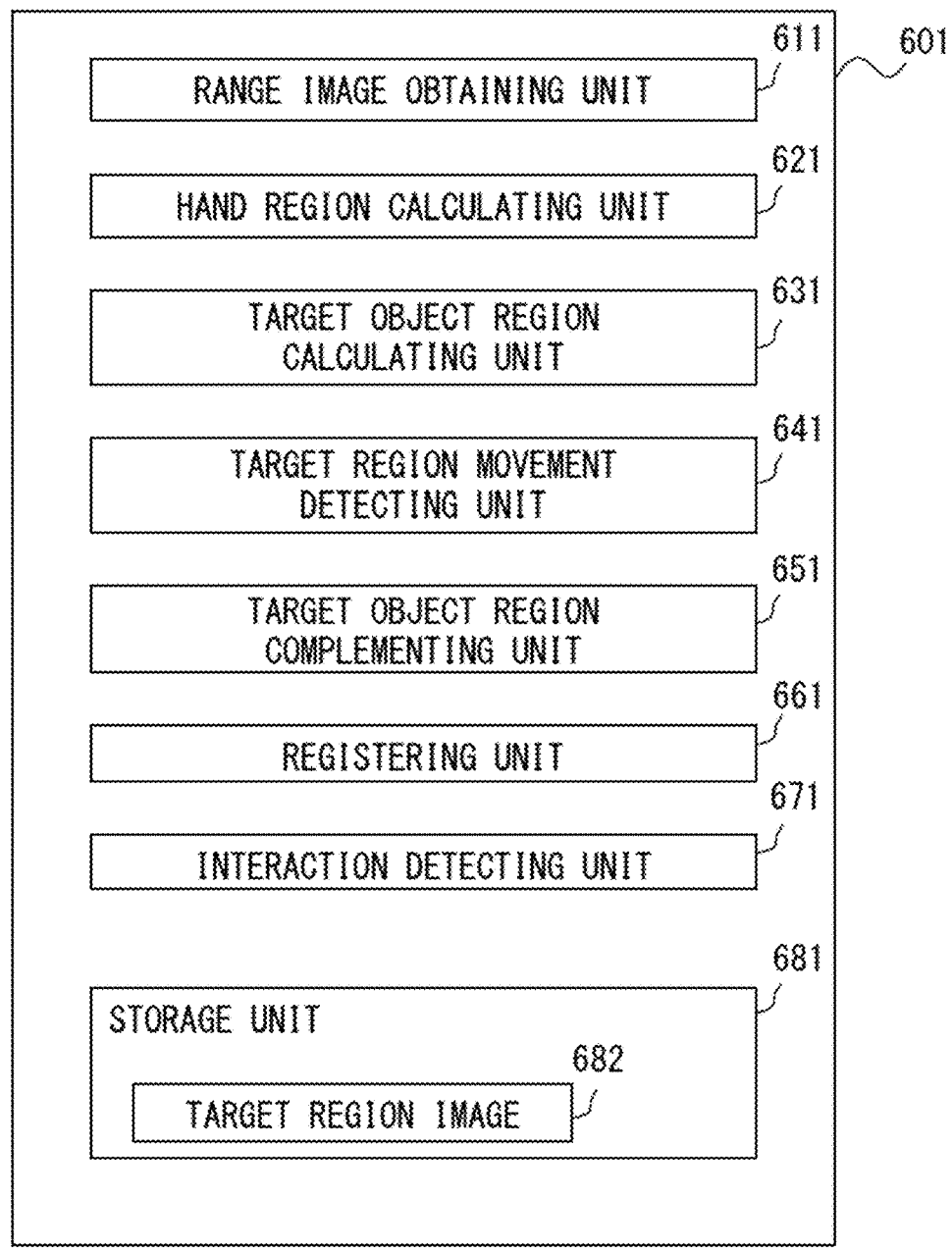
FIG. 7 is the configuration diagram of an information processing apparatus in accordance with another embodiment.

FIG. 7 is the configuration diagram of an information processing apparatus in accordance with another embodiment.

An information processing apparatus 601 includes a range image obtaining unit 611, a hand region calculating unit 621, a target object region calculating unit 631, a target object movement detecting unit 641, a target object region complementing unit 651, a registering unit 661, an interaction detecting unit 671, and a storage unit 681.

The information processing apparatus 601 is a computer, e.g., a PC. The information processing apparatus 601 corresponds to the information processing apparatus 21 depicted in FIGS. 1 and 2.

The range image obtaining unit 611 measures the distance between the range image obtaining unit 611 and an object within a shooting range, converts the measured distance into a value that falls within a predetermined range (e.g., 0-255), and generates a range image (depth map) that has the value as a pixel value. The range image is a grayscale image representing the measured distance using shades of gray with, for example, the pixel value of pixels falling within a range of 0 to 255. The range image becomes darker (more intensely colored) as the distance becomes shorter, leading to a lower pixel value; the range image becomes brighter (more softly colored) as the distance becomes longer, leading to a higher pixel value. The range image obtaining unit 611 is, for example, a range sensor. The range image obtaining unit 611 corresponds to the range sensor 22 depicted in FIG. 1 and the range sensor included in the interactive projector 23.

The hand region calculating unit 621 calculates the region of the hand (hand region) from a range image. The hand region calculating unit 621 calculates a hand region according to, for example, a distance indicated by the pixel values of the range image. When, for example, the range sensor is installed above the target object 201, as depicted in FIG. 1, the hand 301 is considered to be closer to the range sensor than the target object 201 is. Accordingly, the hand region calculating unit 621 calculates, as a hand region, a region of the range image that has a pixel value that is equal to or less than a threshold. The hand region calculating unit 621 also calculates the positions (coordinates) of fingertips in the hand image within the range image. The hand region calculating unit 621 may calculate the positions of all fingertips within the hand region, or may calculate only the position of the tip of a predetermined finger (e.g., index finger).

The target object region calculating unit 631 deletes the hand region from the range image. A range image from which has been deleted a hand region will hereinafter be referred to as a hand-region-deleted image.

The target object movement detecting unit 641 detects a movement of a target object. In particular, the target object movement detecting unit 641 compares a hand-region-deleted image with a target region image 682 created in the past, so as to determine whether the target object has been moved. The target region image 682 created in the past is one that was stored in the storage unit 681 the last time an interaction process was performed.

The target object region complementing unit 651 complements, using the target region image 682 created in the past, the portion of the hand-region-deleted image that corresponds to the hand region, and averages the regions other than the hand region using the target region image 682 and an averaging count of each pixel, thereby creating a complemented image.

When a movement of the target object has not been detected, the registering unit 661 stores (registers) the complemented image in the storage unit 681 as a new target region image 682. In particular, the registering unit 661 updates a target region image 682 created in the past that is currently stored in the storage unit 681 to the complemented image. The registering unit 661 updates the averaging count of each pixel of the target region image 682.

When a movement of the target object has been detected, the registering unit 661 stores (registers) a hand-region-deleted image in the storage unit 681 as a new target region image 682. In particular, the registering unit 661 updates a target region image 682 created in the past that is currently stored in the storage unit 681 to the hand-region-deleted image. The registering unit 661 initializes the averaging count of each pixel of the target region image 682. The registering unit 661 is an example of the updating unit.

The interaction detecting unit 671 detects a touch on a target object according to Zref, a reference height, Z, a fingertip height, and $\alpha$, a margin.

The storage unit 681 is a storage apparatus that stores a program, data, and the like to be used by the information processing apparatus 601. The storage unit 681 stores target region images 682. The storage unit 681 stores the averaging count of each pixel of the target region image 682. The averaging count of a certain pixel refers to the number of pixel values used to calculate the pixel value of that pixel. The averaging count also indicates the number of times averaging processing is performed to calculate the pixel value of the pixel, and is represented as 1 plus the number of times the averaging processing is performed.

Figure 8:
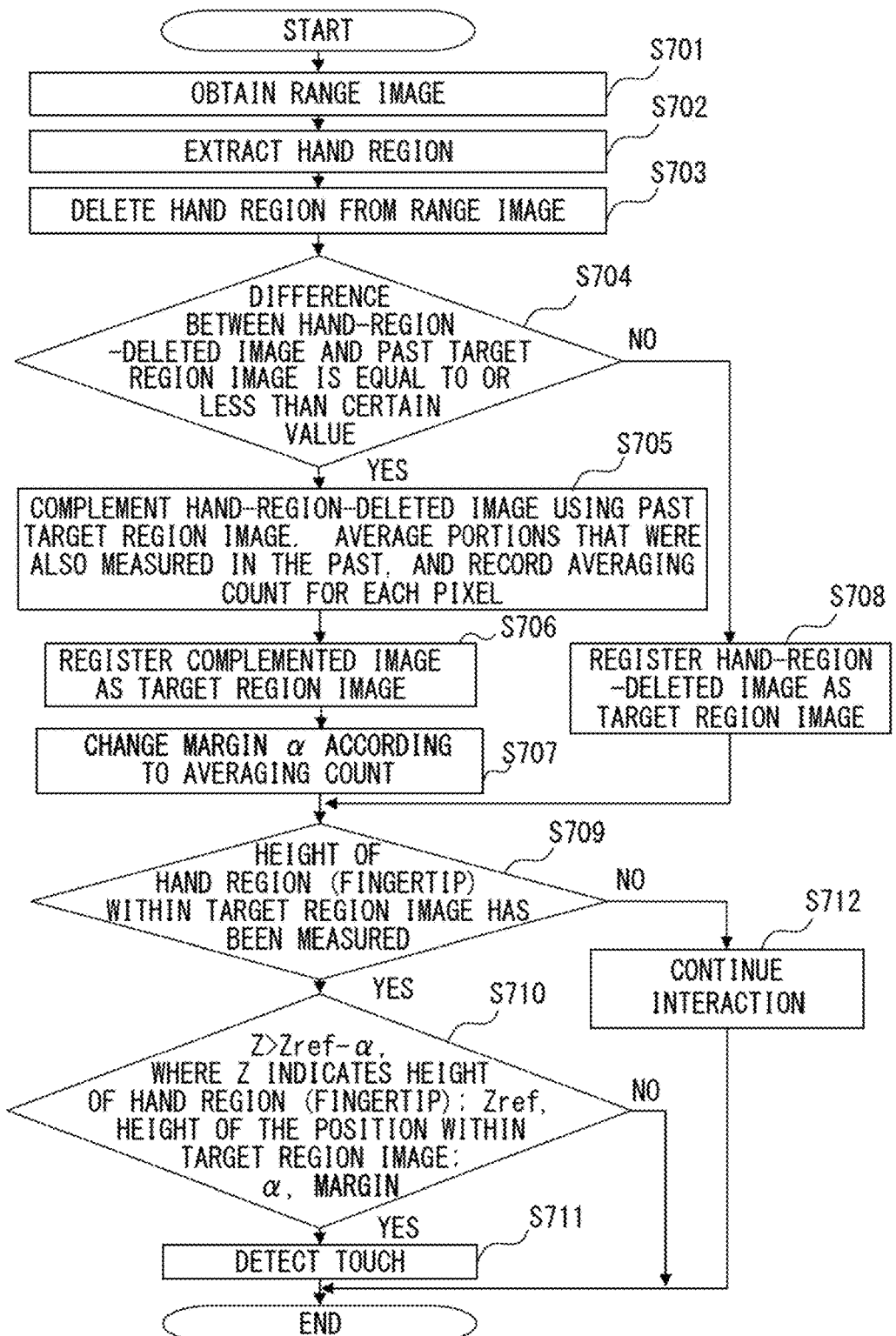
FIG. 8 is a flowchart of an interaction process in accordance with another embodiment.

FIG. 8 is a flowchart of an interaction process in accordance with another embodiment.

Figure 9:
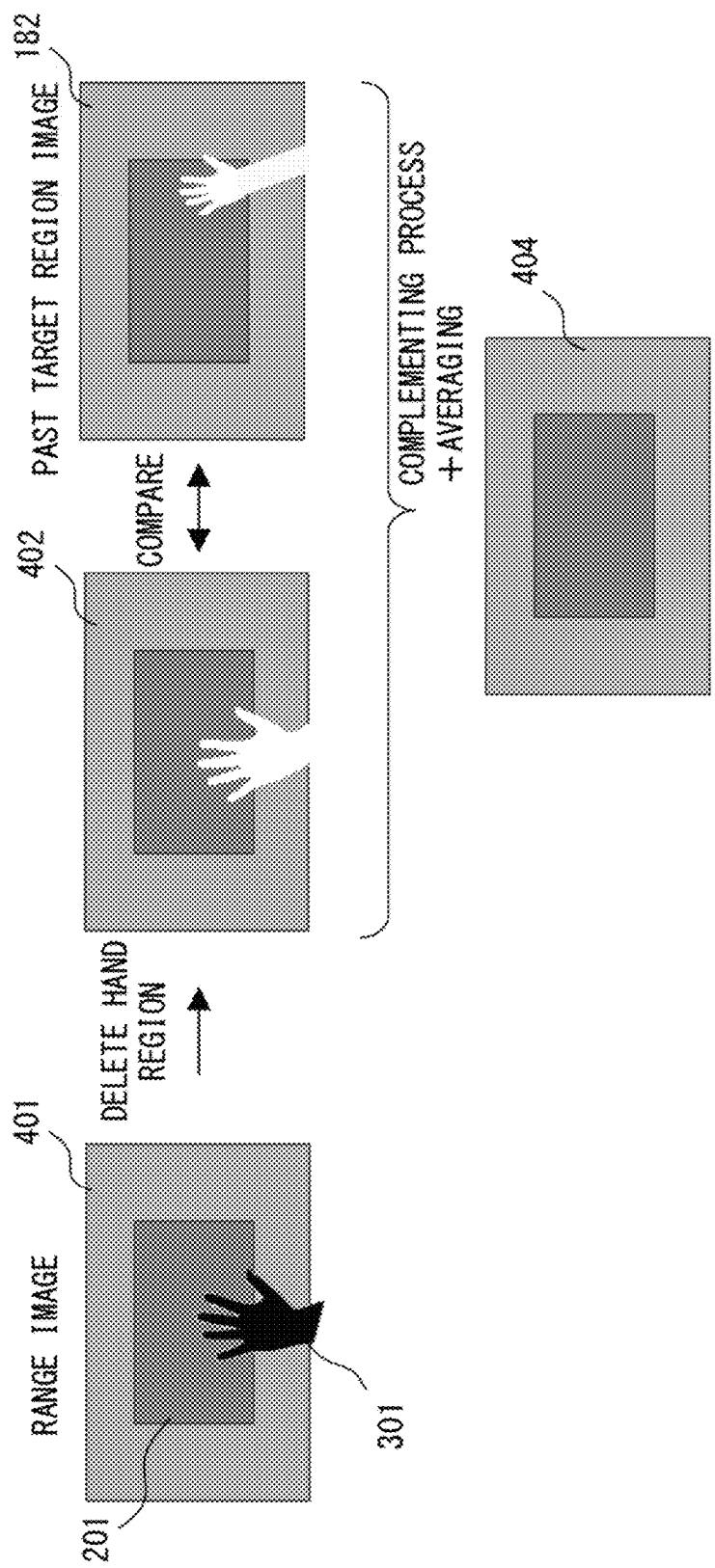
FIG. 9 is an explanatory diagram for an interaction process in accordance with another embodiment.

FIG. 9 is an explanatory diagram for an interaction process in accordance with another embodiment.

In this other embodiment, a cuboid object (target object) 201 is on a table, and the range image obtaining unit 611 is installed above the target object 201. The user takes an action on the target object 201, such as touching the target object 201 with a fingertip, and the information processing apparatus 601 detects the action and performs corresponding processing.

In step S701, the range image obtaining unit 611 obtains a range image 401. In FIG. 9, the range image 401 includes the target object 201 and a hand 301.

In step S702, the hand region calculating unit 621 calculates the region of the hand 301 (hand region) from the range image 401. The hand region calculating unit 621 also calculates the position of a fingertip of the hand region. In an embodiment, the position of the tip of the forefinger is detected as the position of a fingertip.

In step S703, the target object region calculating unit 631 generates a hand-region-deleted image 402 by deleting the hand region from the range image 401.

In step S704, the target object movement detecting unit 641 calculates differences between the pixel values of individual pixels of the hand-region-deleted image 402 and the pixel values of corresponding pixels of a past target region image 682 stored in the storage unit 681. The target object movement detecting unit 141 calculates, as an evaluation value, the number of differences that are equal to or greater than a threshold a from among the plurality of calculated differences. The past target region image 682 is one that was stored in the storage unit 681 the last time the interaction process was performed.

The target object movement detecting unit 641 compares the evaluation value with a threshold b, and determines according to the comparison result whether the target object 201 has been moved. In particular, when the evaluation value is equal to or less than the threshold b, the target object movement detecting unit 641 determines that the target object 201 has not been moved, and the control shifts to step S705. When the evaluation value is greater than the threshold b, the target object movement detecting unit 641 determines that the target object 201 has been moved, and the control shifts to step S708.

When the target object 201 has been moved after the last time the interaction process was performed, the evaluation value becomes greater than the threshold b. When the target object 201 has not been moved after the last time the interaction process was performed, the evaluation value becomes equal to or less than the threshold b.

In step S705, the target object region complementing unit 651 complements, using the target region image 682 created in the past, the portion of the hand-region-deleted image 402 that corresponds to the hand region. In addition, the target object region complementing unit 651 creates a complemented image 404 by averaging each pixel of a first region of the hand-region-deleted image 402 that corresponds the portions other than the hand region using each pixel of a second region of the past target region image 682 that corresponds to the first region, and the averaging count of each pixel of the second region. However, for portions of the second region for which a distance has not been measured, i.e., portions without a pixel value, the complemented image 404 is created using the pixel values of the pixels of the first region that correspond to those portions.

Let $v(x, y)$ be the pixel value of a pixel $p(x, y)$ of the first region in the hand-region-deleted image 402, and let $v'(x, y)$ be the pixel value of a pixel $p'(x, y)$ of the second region in the target region image 682. Let $n_{xy}$ indicate the averaging count of the pixel $p'(x, y)$. In this situation, the complemented image 404 includes a pixel $p''(x, y)$ with a pixel value expressed as $v''(x, y)=(v(x, y)+n_{xy}*v'(x, y))/(n_{xy}+1)$.

The registering unit 661 adds 1 to the averaging count of each pixel of the second region in the target region image 682.

In step S706, the registering unit 161 stores (registers) the complemented image 404 in the storage unit 681 as a new target image 682. In particular, the registering unit 661 updates a target region image 682 created in the past that is currently stored in the storage unit 681 to the complemented image 404.

In step S707, the interaction detecting unit 671 changes a margin $\alpha$ for each pixel of the target region image 682 according to the averaging count of the pixel. $\alpha_{xy}$, a margin for the pixel $p(x, y)$ of the target region image 682, is calculated by the following formula, where $n_{xy}$ indicates the averaging count of the pixel $p(x, y)$.

$$\alpha_{xy}=(1*\beta)/(n_{xy})*\alpha_0$$

$\alpha_0$, which indicates an initial margin, and which indicates an arbitrary constant ($0<\beta\leq1$), are set in advance according to the measurement accuracy of the range image obtaining unit 611. $\beta$ is a constant that indicates the extent that an averaging count $n_{xy}$ is considered. As expressed by the formula above, a larger averaging count $n_{xy}$ leads to a smaller margin $\alpha_{xy}$.

In step S708, the registering unit 661 stores (registers) the hand-region-deleted image 402 in the storage unit 681 as a new target region image 682. In particular, the registering unit 661 updates a target region image 682 created in the past that is currently stored in the storage unit 681 to the hand-region-deleted image 402. The registering unit 661 initializes the averaging count of each pixel of the target region image 682. In particular, the registering unit 661 sets 0 as the averaging count of the pixels of the hand region within the target region image 682, and sets 1 as the averaging count of the pixels of the regions other than the hand region within the target region image 682.

In step S709, the interaction detecting unit 671 determines whether the height of the position within the target region image 682 that corresponds to the position of the fingertip of the hand region has been measured. When a pixel value has been obtained for the position within the target region image 682 that corresponds to the position of the fingertip of the hand region, the interaction detecting unit 171 determines that the height of the position within the target region image 682 that corresponds to the fingertip position has been measured, and the control shifts to step S710. When a pixel value has not been obtained for the position within the target region image 682 that corresponds to the position of the fingertip of the hand region, the interaction detecting unit 671 determines that the height of the position within the target region image 182 that corresponds to the fingertip position has not been measured, and the control shifts to step S712.

In step S710, the interaction detecting unit 671 determines whether the height Z, i.e., the height (pixel value) of the position within the range image 401 that corresponds to the height of the fingertip position of the hand 301, i.e., the height of position $p(x, y)$, is greater than the reference height Zref with the margin $\alpha_{xy}$ that corresponds to the fingertip position subtracted therefrom. When $Z>Zref-\alpha_{xy}$ (i.e., when the difference between the reference height Zref and the fingertip height Z is less than the margin $\alpha_{xy}$), the control shifts to step S711. The reference height Zref is the height (pixel value) of the position within the target region image 682 that corresponds to the position of the fingertip within the range image 401. When $Z\leq Zref-\alpha_{xy}$, the interaction detecting unit 671 determines that a touch has not been detected, and the process ends.

In step S711, the interaction detecting unit 671 detects a touch. When the fingertip position is within the region of the target object 201 in the target region image 682, the interaction detecting unit 671 determines that the fingertip has touched the target object 201. When the fingertip is located outside the region of the target object 201 in the target region image 682, the interaction detecting unit 171 determines that the fingertip has touched the table. The interaction detecting unit 171 performs predetermined processing that corresponds to the detection of a touch on the target object 201 or the table.

In step S712, the interaction detecting unit 671 continues the interaction for the previous frame. In particular, when a touch was detected in the previous interaction process, the interaction detecting unit 671 also determines that a touch has been detected in the current interaction process, and performs predetermined processing that corresponds to the detection of the touch. When a touch was not detected in the previous interaction process, the interaction detecting unit 671 also determines that a touch has not been detected in the current interaction process.

In this other embodiment, the interaction process is performed repeatedly at short intervals (e.g., performed every sixtieth to thirtieth of a second). As a result, a target region image 182 that indicates the position of the target object 201 is registered as soon as the target object 201 has been installed or moved. Information on the height of a portion of the target object 201 that has been hidden by the hand is complemented using a past target region image 182, thereby eliminating the need for the conventional calibration process.

When a target object has been installed or moved, the information processing apparatus in accordance with this other embodiment immediately enables the interaction.

Using averages from a past target region image, the information processing apparatus in accordance with this other embodiment calculates a target region image that indicates the position of a target object 201, thereby improving the accuracy and decreasing a likelihood of erroneous determination.

When a target object has been installed or moved, the information processing apparatus in accordance with this other embodiment does not need to perform the conventional calibration process, thereby improving the usability.

Unlike the case in the invention of patent document 2, the information processing apparatus in accordance with this other embodiment does not need to assign markers (barcodes) to identify the three-dimensional shape of a target object, thereby improving the usability.

Figure 10:
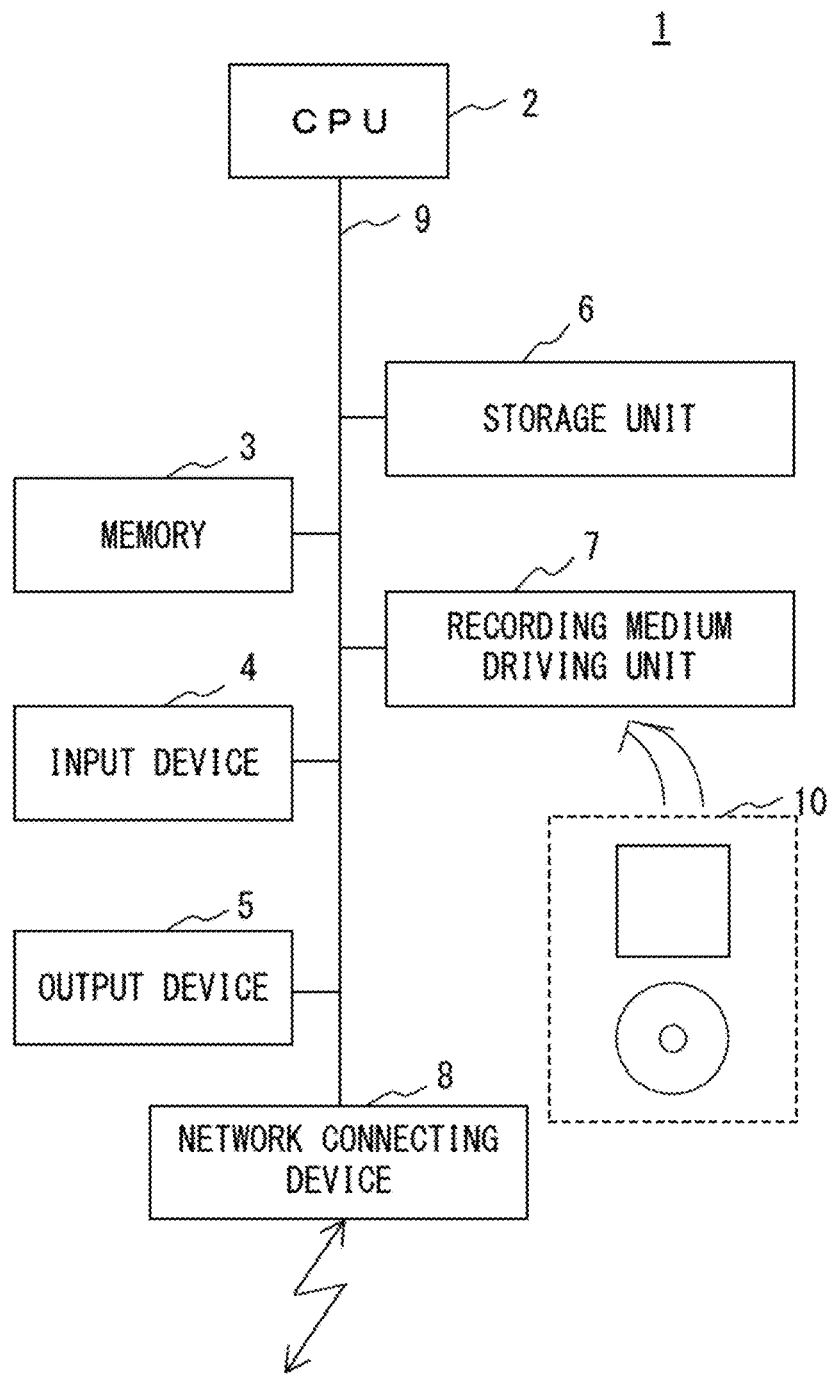
FIG. 10 is the configuration diagram of an information processing apparatus (computer).

FIG. 10 is the configuration diagram of an information processing apparatus (computer).

The information processing apparatuses 101 and 601 in accordance with an embodiment maybe achieved by, for example, an information processing device (computer) 1 depicted in FIG. 10.

The information processing device 1 includes a CPU 2, a memory 3, an input device 4, an output device 5, a storage unit 6, a recording medium driving unit 7, and a network connecting unit 8, all of which are connected to each other by a bus 9.

The CPU 2 is a central processor that controls the entirety of the information processing apparatus 1. The CPU 2 is operated as the hand region calculating units 121 and 621, the target object region calculating units 131 and 631, the target object movement detecting units 141 and 641, the target object region complementing units 151 and 651, the registering units 161 and 661, and the interaction detecting units 171 and 671.

The memory 3 is a memory such as a Read Only Memory (ROM) or a Random Access Memory (RAM) that, in program execution, temporarily stores a program or data stored in the storage unit 6 (or a portable recording medium 10). The CPU 2 performs the various processes described above by executing a program using the memory 3.

In this case, a program code itself read from, for example, the portable recording medium 10 achieves functions of an embodiment.

The input device 4 is used to, for example, input information or an instruction from a user or an operator and obtain data to be used for the information processing apparatus 1. The input device 4 is, for example, a keyboard, a mouse, a touch panel, a camera, or a range sensor. The input unit 4 corresponds to the range image obtaining unit 111.

The output device 5 outputs a query or a result of processing to a user or an operator and is operated under the control of the CPU 2. The output device 5 is, for example, a display or a printer.

The storage unit 6 is, for example, a magnetic disk device, an optical disk device, or a tape device. The information processing device 1 stores the program and data described above in the storage unit 6 and loads them into the memory 3 for use on an as-needed basis. The memory 3 and the storage unit 6 correspond to the storage units 181 and 681.

The recording medium driving unit 7 drives the portable recording medium 10 and accesses data recorded therein. An arbitrary computer-readable recording medium such as a memory card, a flexible disk, a Compact Disk Read Only Memory (CD-ROM), an optical disk, or a magnetic optical disk is used as the portable recording medium. The user stores the program and data described above in the portable recording medium 10 and loads them into the memory 3 for use on an as-needed basis.

The network connecting unit 8 is a communication interface that is connected to arbitrary communication networks such as a Local Area Network (LAN) or a Wide Area Network (WAN) and that performs data conversion associated with communications. The network connecting unit 8 transmits/receives data to/from a device connected over a communication network.

All examples and conditional language provided herein are intended for pedagogical purposes to aiding the reader in understanding the invention and the concepts contributed by the inventor to further the art, and are not to be construed as being limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory that stores a target region image generated in the past that indicates a distance to a target object; and
a processor coupled to the memory and configured to
calculate a hand region within a range image obtained after the target region image has been generated, the range image indicating a distance to a hand and the target object,
detect a movement of the target object by comparing the target region image with an image that is the range image with the hand region deleted therefrom,
when a movement of the target object is not detected, generate a complemented image by complementing, using the target region image, a portion that corresponds to the hand region within the image from which the hand region has been deleted,
when a movement of the target object is not detected, update the target region image with the complemented image, and
when a movement of the target object has been detected, update the target region image with the image from which the hand region has been deleted.

2. The information processing apparatus according to claim 1, wherein
the processor creates the complemented image by averaging each pixel of a first region of the range image that corresponds to portions other than the hand region according to each pixel of a second region of the target region image that corresponds to the first region, and an averaging count of each pixel of the second region.

3. The information processing apparatus according to claim 2, wherein
the processor calculates a margin according to the averaging count, and detects a touch on the target object when a difference between a fingertip height of the hand region and a height of the target object is less than the margin.

4. The information processing apparatus according to claim 3, wherein
the margin becomes smaller as the averaging count becomes larger.

5. An interaction method to be performed by an information processing apparatus that stores a target region image generated in the past that indicates a distance to a target object, the interaction method comprising:
calculating, by a processor, a hand region within a range image obtained after the target region image has been generated, the range image indicating a distance to a hand and the target object;
detecting, by the processor, a movement of the target object by comparing the target region image with an image that is the range image with the hand region deleted therefrom;
when a movement of the target object is not detected, generating, by the processor, a complemented image by complementing, using the target region image, a portion that corresponds to the hand region within the image from which the hand region has been deleted;
when a movement of the target object is not detected, updating, by the processor, the target region image with the complemented image; and
when a movement of the target object has been detected, updating, by the processor, the target region image with the image from which the hand region has been deleted.

6. The interaction method according to claim 5, wherein
the generating of the complemented image averages each pixel of a first region of the range image that corresponds to portions other than the hand region according to each pixel of a second region of the target region image that corresponds to the first region, and an averaging count of each pixel of the second region.

7. The interaction method according to claim 6, further comprising:
calculating a margin according to the averaging count, and detecting a touch on the target object when a difference between a fingertip height of the hand region and a height of the target object is less than the margin.

8. The interaction method according to claim 7, wherein
the margin becomes smaller as the averaging count becomes larger.

9. A non-transitory storage medium having stored therein a program for causing a computer to execute a process, the computer storing a target region image generated in the past that indicates a distance to a target object, the process comprising:
calculating a hand region within a range image obtained after the target region image has been generated, the range image indicating a distance to a hand and the target object;
detecting a movement of the target object by comparing the target region image with an image that is the range image with the hand region deleted therefrom;
when a movement of the target object is not detected, generating a complemented image by complementing, using the target region image, a portion that corresponds to the hand region within the image from which the hand region has been deleted;
when a movement of the target object is not detected, updating the target region image with the complemented image; and
when a movement of the target object has been detected, updating the target region image with the image from which the hand region has been deleted.

10. The non-transitory storage medium according to claim 9, wherein
the generating of the complemented image averages each pixel of a first region of the range image that corresponds to portions other than the hand region according to each pixel of a second region of the target region image that corresponds to the first region, and an averaging count of each pixel of the second region.

11. The non-transitory storage medium according to claim 10, the process further comprising:
calculating a margin according to the averaging count, and detecting a touch on the target object when a difference between a fingertip height of the hand region and a height of the target object is less than the margin.

12. The non-transitory storage medium according to claim 11, wherein
the margin becomes smaller as the averaging count becomes larger.

* * * * *